United States Patent
Yano (10) Patent No.: US 10,320,059 B2
(45) Date of Patent: Jun. 11, 2019

(54) ELECTRONIC DEVICE

(71) Applicant: KYOCERA CORPORATION, Kyoto (JP)

(72) Inventor: Kentaro Yano, Kitakyushi (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/739,614

(22) PCT Filed: Mar. 11, 2016

(86) PCT No.: PCT/JP2016/057808
§ 371 (c)(1),
(2) Date: Dec. 22, 2017

(87) PCT Pub. No.: WO2016/208232
PCT Pub. Date: Dec. 29, 2016

(65) Prior Publication Data
US 2018/0175485 A1    Jun. 21, 2018

(30) Foreign Application Priority Data

Jun. 25, 2015  (JP) .................................. 2015-127558

(51) Int. Cl.
*H01Q 1/24* (2006.01)
*H01R 12/59* (2011.01)
*H04M 1/02* (2006.01)

(52) U.S. Cl.
CPC ........... *H01Q 1/243* (2013.01); *H01R 12/592* (2013.01); *H04M 1/02* (2013.01)

(58) Field of Classification Search
CPC ....................................................... H01Q 1/24
(Continued)

(56) References Cited

U.S. PATENT DOCUMENTS

2013/0321238 A1* 12/2013 Okano ..................... H01Q 1/38
                                                                   343/873
2014/0028522 A1*  1/2014 Wheeler ............. H01Q 21/007
                                                                   343/873

FOREIGN PATENT DOCUMENTS

JP    H11-355023 A    12/1999
JP    2000-114833 A    4/2000
(Continued)

OTHER PUBLICATIONS

International Search Report/Written Opinion dated May 17, 2016, in corresponding International Application No. PCT/JP2016/057808 with Concise Explanation of Written Opinion of International Searching Authority.
(Continued)

*Primary Examiner* — Andrea Lindgren Baltzell
(74) *Attorney, Agent, or Firm* — Duane Morris LLP (57) ABSTRACT

An electronic device includes a housing including an accommodation space therein, a conduction portion located to be exposed to the outside of the housing and to the inside of the housing, a cover member which covers the housing, and a flexible connection member which is located between the housing and the cover member, includes a free one end, and has one end fixed to the housing. The connection member includes a contact portion which is opposed to and in contact with the conduction portion, and the contact portion is in contact with the conduction portion as a side of the free end of the connection member is pressed toward the housing by the cover member.

10 Claims, 8 Drawing Sheets

(58) Field of Classification Search
   USPC .......................................................... 343/873
   See application file for complete search history.

(56)     References Cited

FOREIGN PATENT DOCUMENTS

JP       2010-035045 A      2/2010
   JP       2013-150281 A      8/2013

OTHER PUBLICATIONS

Official Action issued in corresponding Japanese Patent Application No. 2015-127558 with Concise Explanation/Statement of Relevance of Non-English References.

* cited by examiner

FIG.8 ical Application No. 2015-127558, filed on Jun. 25, 2015. PCT International Application No. PCT/JP2016/057808 is entitled "Electronic Apparatus", and Japanese Patent Application No. 2015-127558 is entitled "Electronic Device". The content of which are incorporated by reference herein in their entirety.

ELECTRONIC DEVICE

CROSS-REFERENCE TO RELATED APPLICATION

The present application is the National Phase of PCT International Application No. PCT/JP2016/057808, filed on Mar. 11, 2016, which claims priority under 35 U.S.C. 119 (a) to Japanese Patent Application No. 2015-127558, filed on Jun. 25, 2015. PCT International Application No. PCT/JP2016/057808 is entitled "Electronic Apparatus", and Japanese Patent Application No. 2015-127558 is entitled "Electronic Device". The content of which are incorporated by reference herein in their entirety.

FIELD

The present disclosure relates to an electronic device.

BACKGROUND

For example, a portable terminal device representing one example of the background art has an antenna pattern printed on a housing.

SUMMARY

An electronic device based on the present disclosure includes a housing, a conduction portion located to be exposed to the outside of the housing and exposed to the inside of the housing, a cover member which covers the housing, and a flexible connection member which is located between the housing and the cover member, includes free one end, and has a part fixed to the housing. The connection member includes a contact portion which is opposed to and in contact with the conduction portion. The contact portion is in contact with the conduction portion as a side of the free end of the connection member is pressed toward the housing by the cover member.

DETAILED DESCRIPTION

An embodiment of the present disclosure will be described below in detail with reference to the drawings. In an embodiment shown below, description will be given by exemplifying a portable terminal device such as a portable telephone, a smartphone, a portable information terminal, or a tablet terminal as an electronic device. In an embodiment shown below, the same or common elements in the drawings have the same reference characters allotted and description thereof will not be repeated.

First Embodiment

Figure 1:
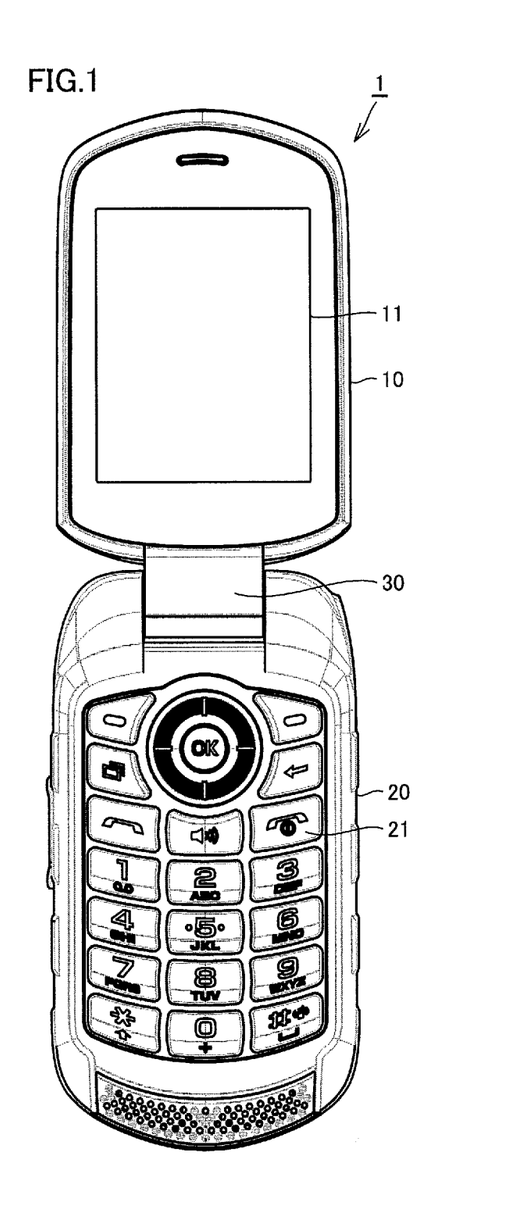
FIG. 1 is a front view of a portable terminal device according to a first embodiment in an open state.
Figure 2:
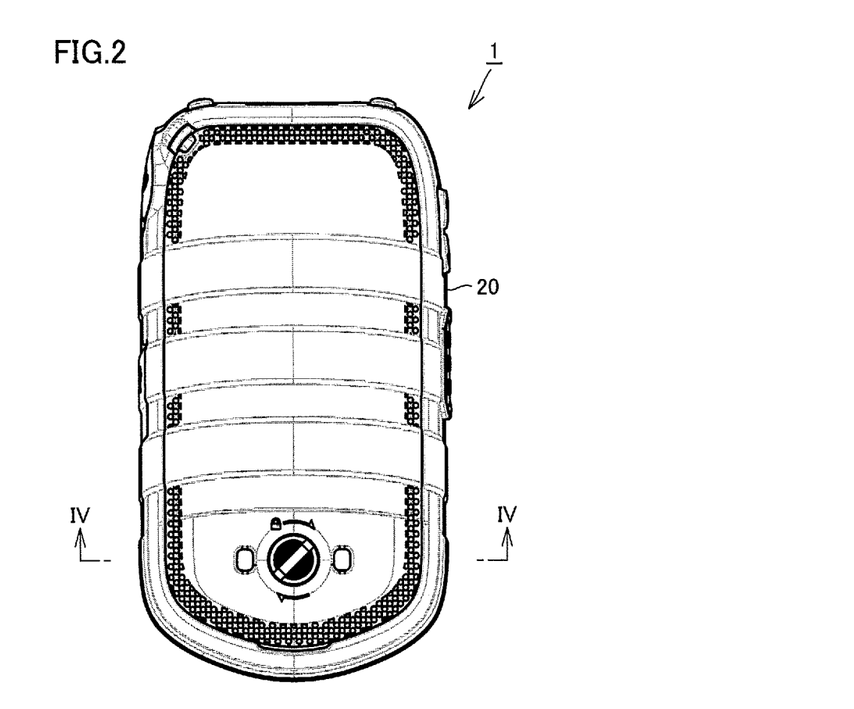
FIG. 2 is a rear view of the portable terminal device according to the first embodiment in a closed state.

FIG. 1 is a front view of a portable terminal device according to a first embodiment in an open state. FIG. 2 is a rear view of the portable terminal device according to the first embodiment in a closed state. A portable terminal device 1 according to the first embodiment will be described with reference to FIGS. 1 and 2.

As shown in FIGS. 1 and 2, portable terminal device 1 according to the first embodiment is constructed to be foldable. Portable terminal device 1 includes a first constituent portion 10 including a display 11, a second constituent portion 20 including a plurality of operation keys 21, and a coupling portion 30 which pivotably couples first constituent portion 10 and second constituent portion 20 to each other.

Figure 3:
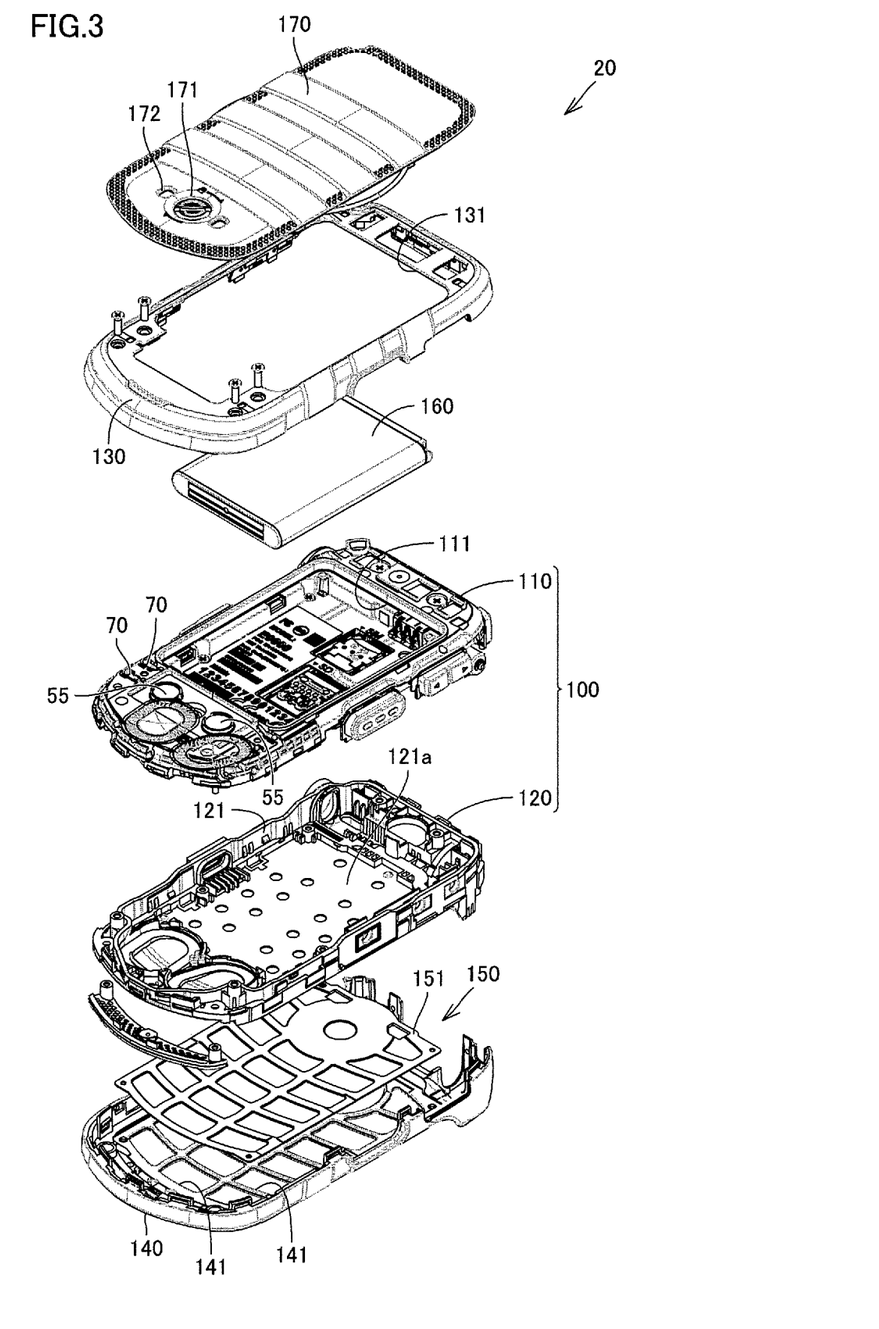
FIG. 3 is an exploded perspective view of an operation side of the portable terminal device according to the first embodiment.
Figure 4:
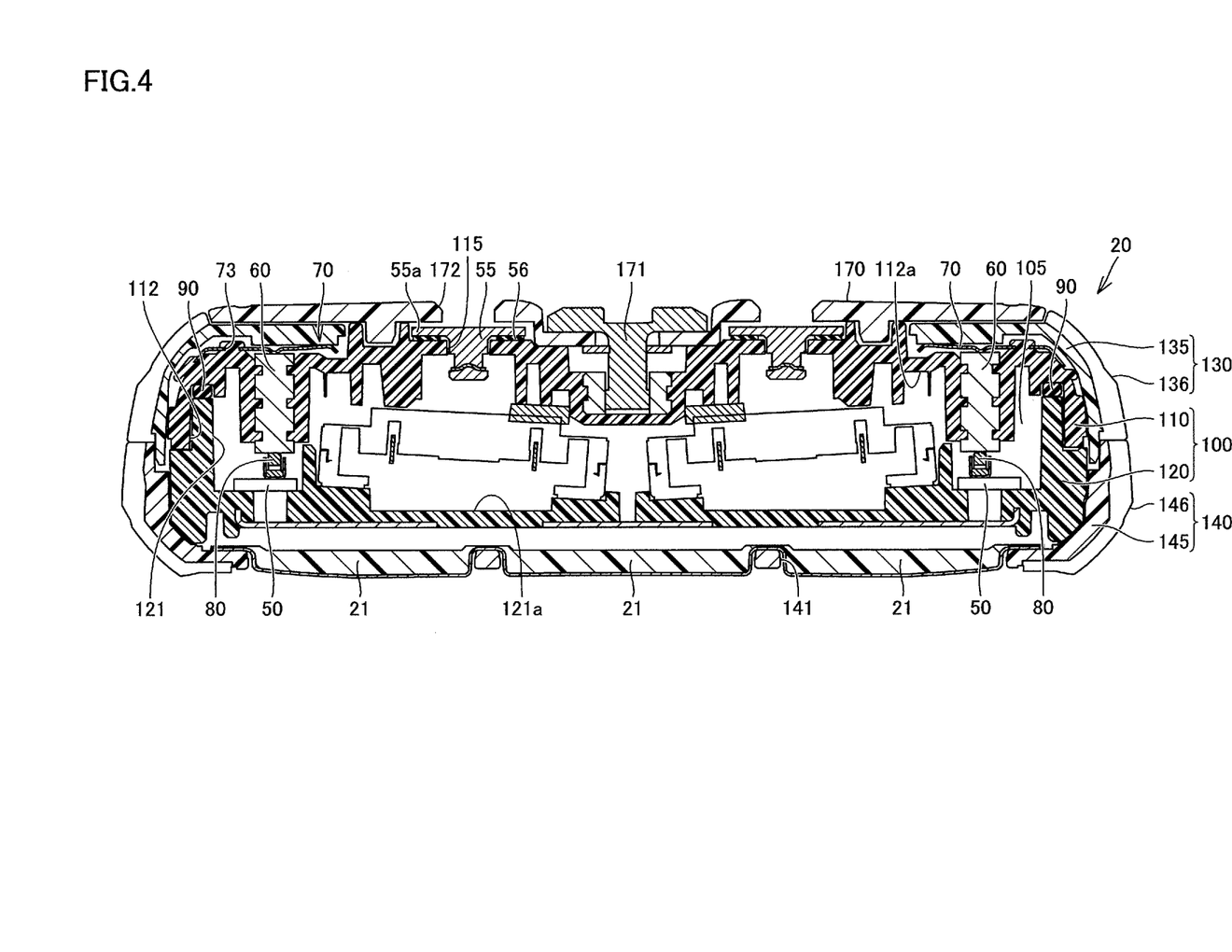
FIG. 4 is a cross-sectional view along the line IV-IV shown in FIG. 2.

FIG. 3 is an exploded perspective view of an operation side of the portable terminal device according to the first embodiment. FIG. 4 is a cross-sectional view along the line IV-IV shown in FIG. 2. Second constituent portion 20 included in the operation side of portable terminal device 1 according to the first embodiment will be described with reference to FIGS. 3 and 4.

As shown in FIG. 3, second constituent portion 20 includes a housing 100, a rear cover 130 as a cover member, a front cover 140, a key sheet 150, a battery 160, a lid member 170, and an insert pin 60 as a conduction portion which will be described later.

Housing 100 includes a first housing portion 110 and a second housing portion 120. First housing portion 110 is composed, for example, of a resin member. A battery accommodation portion 111 which accommodates battery 160 is located on a rear surface side of first housing portion 110. An accommodation recess 112 (see FIG. 4) which opens toward the front is located on a front surface side of first housing portion 110.

A part of an antenna 70 is fixed to the rear surface side of first housing portion 110. A charge terminal 55 is located to be exposed around battery accommodation portion 111 on the rear surface side of first housing portion 110. Charge terminal 55 is configured to charge battery 160.

Second housing portion 120 is composed, for example, of a resin member. An accommodation recess 121 which opens toward a rear surface is located on the rear surface side of second housing portion 120. Second housing portion 120 is located to be able to carry a wiring board (not shown) including a plurality of key switches on the front surface side.

Rear cover 130 is composed, for example, of a resin member. Rear cover 130 can cover first housing portion 110 from the rear surface side of first housing portion 110. Rear cover 130 includes an opening 131 which exposes charge terminal 55 and battery 160 in a bottom surface portion.

Front cover 140 is composed, for example, of a resin member. Front cover 140 can cover second housing portion 120 from the front surface side of second housing portion 120. The wiring board and key sheet 150 are accommodated between front cover 140 and second housing portion 120. Front cover 140 includes a plurality of key holes 141.

Key sheet 150 is constructed, for example, by bonding a plurality of key tops (not shown) on the front surface side of a sheet 151 made of silicone rubber. The plurality of key tops are located at positions corresponding to the plurality of key switches located on the wiring board, respectively. The plurality of key tops can be exposed through the plurality of key holes 141 located in front cover 140, respectively.

Battery 160 is detachably accommodated in battery accommodation portion 111. Lid member 170 is composed of a resin member. Lid member 170 covers opening 131 located in rear cover 130. Lid member 170 is removably fixed to first housing portion 110 by a locking mechanism 171. Lid member 170 includes an opening 172 located at a position corresponding to charge terminal 55. Opening 172 in lid member 170 is opposed to opening 131 in rear cover 130.

As shown in FIG. 4, first housing portion 110 and second housing portion 120 are liquid-tightly engaged with each other. First housing portion 110 and second housing portion 120 can be engaged with each other with a gasket 90 lying therebetween. First housing portion 110 and second housing portion 120 can be engaged with each other with a bottom surface portion 112a of accommodation recess 112 and an upper surface portion 121a of accommodation recess 121 being opposed to each other.

As a result of engagement between first housing portion 110 and second housing portion 120, an accommodation space 105 is formed between first housing portion 110 and second housing portion 120. A circuit substrate 50 is accommodated in accommodation space 105.

Bottom surface portion 112a of accommodation recess 112 includes an opening 115. Charge terminal 55 is inserted in opening 115. Charge terminal 55 includes an edge portion 55a opposed to an outer surface of accommodation recess 112 located at a circumference of opening 115. Edge portion 55a of charge terminal 55 is adhered to the outer surface of accommodation recess 112 by a waterproof sealing member 56.

Charge terminal 55 is exposed to the outside through opening 172 in lid member 170. Charge terminal 55 can thus be in contact with a charge pin on a charger side.

Insert pin 60 passes through first housing portion 110. Insert pin 60 is molded integrally with first housing portion 110 by insert molding. By integrally molding insert pin 60 and first housing portion 110 with each other, waterproofness can be enhanced.

Insert pin 60 is in a substantially columnar shape. An outer circumferential surface of insert pin 60 includes projections and recesses. By forming the outer circumferential surface of insert pin 60 to include projections and recesses, close contact between first housing portion 110 and insert pin 60 can be improved.

Insert pin 60 includes a pair of a first end portion and a second end portion in a longitudinal direction. A side of the first end portion of insert pin 60 is exposed to the outside of housing 100 and a side of the second end portion of insert pin 60 is exposed to the inside of housing 100. The side of the second end portion of insert pin 60 exposed to the inside of housing 100 is electrically connected to circuit substrate 50 by a spring terminal 80. The side of the first end portion exposed to the outside of housing 100 can be in contact with antenna 70.

Housing 100 is accommodated between rear cover 130 and front cover 140. Rear cover 130 is molded, for example, through two-color molding, and includes a first portion 135 and a second portion 136. Second portion 136 is located on an outer surface of first portion 135. Front cover 140 is formed, for example, through two-color molding, and includes a first portion 145 and a second portion 146. Second portion 146 is located on an outer surface of first portion 145.

Figure 5:
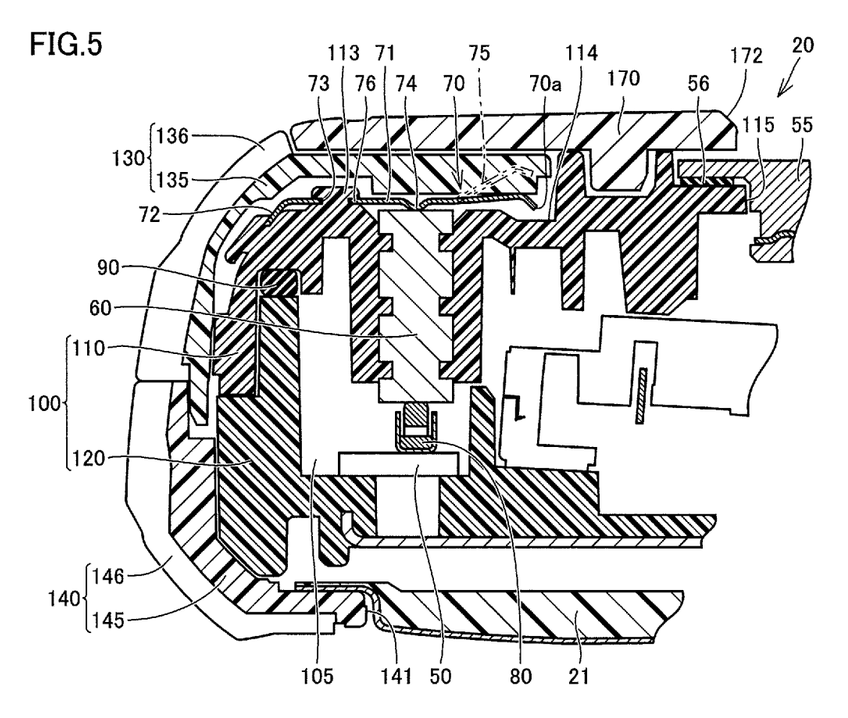
FIG. 5 is an enlarged cross-sectional view showing a structure around an antenna included in the portable terminal device according to the first embodiment.

FIG. 5 is an enlarged cross-sectional view showing a structure around the antenna included in the portable terminal device according to the first embodiment. The structure around antenna 70 included in the portable terminal device according to the first embodiment will be described with reference to FIG. 5.

As shown in FIG. 5, antenna 70 is located between first housing portion 110 and rear cover 130. Antenna 70 is covered with rear cover 130. Antenna 70 is made up of a metal piece in a form of a band. Antenna 70 includes a portion 71 extending along a rear surface of first housing portion 110 and a portion 72 extending along an outer surface of first housing portion 110.

Portion 71 of antenna 70 which extends along the rear surface of first housing portion 110 includes a fixation hole 73. As fixation hole 73 is passed through by a pin portion 113 located in the rear surface of first housing portion 110, antenna 70 is fixed.

Specifically, by pressing pin portion 113 with pin portion 113 passing through fixation hole 73, a circumferential edge around fixation hole 73 is sandwiched between a tip end portion and a root portion of pin portion 113. A portion of antenna 70 sandwiched between the tip end portion and the root portion of pin portion 113 forms a fixed portion 76 where antenna 70 is fixed by first housing portion 110.

Antenna 70 is flexible. As antenna 70 is partially fixed, one end 70a of antenna 70 becomes free and a side of one end 70a of antenna 70 can bend and deform.

Antenna 70 includes a contact portion 74 which is opposed to and in contact with insert pin 60. Contact portion 74 is located between fixed portion 76 and one end 70a (free end). Contact portion 74 protrudes toward insert pin 60. Contact portion 74 is tapered.

As shown with a chain double dotted line in the figure, antenna 70 includes an inclined portion 75 which is inclined away from first housing portion 110, between contact portion 74 and one end 70a (free end) before rear cover 130 is attached to first housing portion 110. Since antenna 70 includes inclined portion 75, the side of one end 70a of antenna 70 can reliably be pushed toward first housing portion 110 at the time of attachment of rear cover 130.

A portion of rear cover 130 which presses the side of one end 70a of antenna 70 projects toward first housing portion 110 relative to the portion of rear cover 130 opposed to fixed portion 76. With this feature as well, the side of one end 70a of antenna 70 can reliably be pushed toward first housing portion 110 at the time of attachment of rear cover 130.

As the side of one end 70a of antenna 70 is pressed toward first housing portion 110, the side of one end 70a of antenna 70 pivots to be closer to first housing portion 110 as a whole with fixed portion 76 being defined as the fulcrum. Contact portion 74 comes in contact with insert pin 60.

Contact portion 74 protrudes toward insert pin 60. Therefore, when the side of one end 70a of antenna 70 pivots, contact portion 74 can reliably be in contact with insert pin 60. When contact portion 74 is brought in point contact with insert pin 60, conduction between insert pin 60 and antenna 70 is further stabilized.

First housing portion 110 includes a retracting portion 114 where contact of one end 70a (free end) of antenna 70 with first housing portion 110 at the time of pivot of the side of one end 70a of antenna 70 toward first housing portion 110 with fixed portion 76 being defined as the fulcrum is avoided. Retracting portion 114 is formed as a part of the outer surface (rear surface) of first housing portion 110 retracts toward an inner surface (front surface) of first housing portion 110.

With retracting portion 114, an extent of pivot of the side of one end 70a of antenna 70 is broadened. By pushing one end 70a of antenna 70 closer toward accommodation space 105 in housing 100, the side of one end 70a of antenna 70 as a whole can be closer to first housing portion 110. With this feature as well, contact portion 74 can reliably be in contact with insert pin 60.

As set forth above, in portable terminal device 1 according to the first embodiment, a part of antenna 70 in the form of the band is fixed to first housing portion 110 with one end 70a being free. As rear cover 130 covering first housing portion 110 presses the side of the free end toward first housing portion 110, contact portion 74 of antenna 70 comes in contact with insert pin 60 exposed to the outside and the inside of first housing portion 110.

Contact portion 74 and insert pin 60 can thus reliably be in contact with each other. As a part of antenna 70 is fixed to first housing portion 110, an antenna pattern is prevented from being printed with a foreign matter being introduced on the insert pin. Consequently, electrical connection between antenna 70 and insert pin 60 can be stabilized and antenna performance can be stabilized.

In fixing antenna 70 to first housing portion 110, antenna 70 in the form of the band which is patterned in advance is prepared and fixation hole 73 located in an intermediate portion of antenna 70 in the form of the band is fitted to pin portion 113 located in first housing portion 110. By pressing pin portion 113 with fixation hole 73 being fitted to pin portion 113, the tip end portion and the root portion of pin portion 113 sandwich antenna 70 located around the circumference of fixation hole 73. Antenna 70 is thus fixed to first housing portion 110.

Therefore, as compared with an example in which an antenna pattern is printed each time in conformity with a shape of an outer surface and an outer peripheral surface of first housing portion 110, a manufacturing process can be simplified and antenna 70 can readily be fixed to first housing portion 110. Consequently, portable terminal device 1 can readily be manufactured.

Second Embodiment

Figure 6:
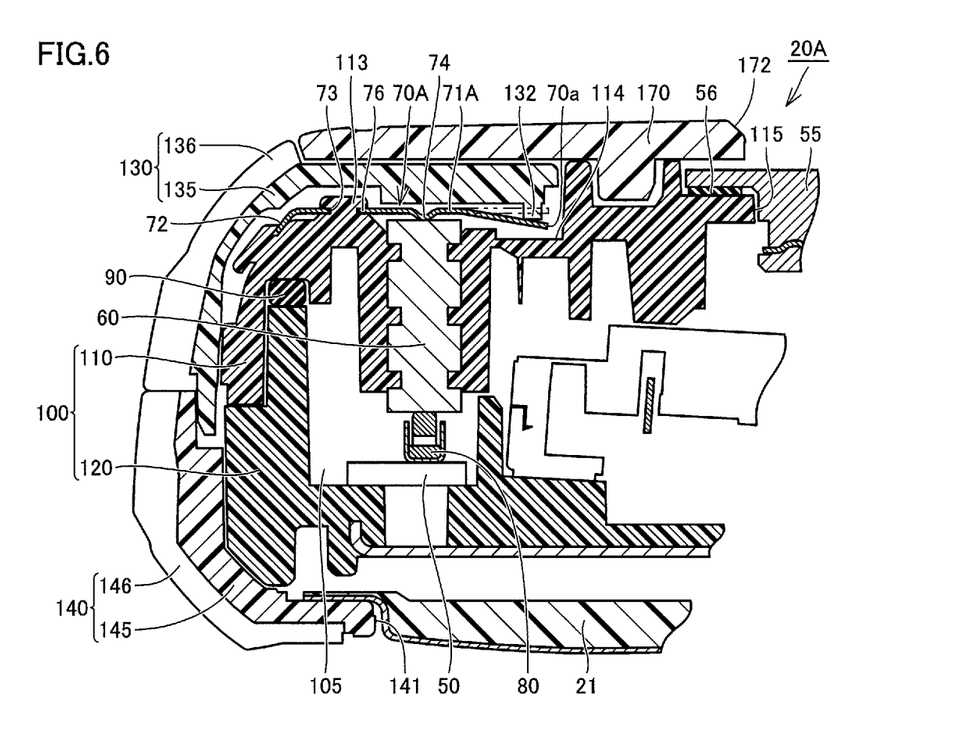
FIG. 6 is an enlarged cross-sectional view showing a structure around an antenna included in the portable terminal device according to a second embodiment.

FIG. 6 is an enlarged cross-sectional view showing a structure around an antenna included in the portable terminal device according to a second embodiment. The portable terminal device according to the second embodiment will be described with reference to FIG. 6.

As shown in FIG. 6, the portable terminal device according to the second embodiment is different from portable terminal device 1 according to the first embodiment in structure around an antenna 70A included in a second constituent portion 20A and is otherwise substantially the same in construction.

In antenna 70A according to the second embodiment, a portion 71A of antenna 70A which extends along the rear surface (outer surface) of first housing portion 110 extends substantially linearly before attachment of rear cover 130. Before attachment of rear cover 130, one end 70a of antenna 70A is located closer to first housing portion 110 than a tip end of pin portion 113.

Rear cover 130 includes a projection portion 132 which presses the side of one end 70a of antenna 70A. Projection portion 132 projects toward first housing portion 110 relative to a portion of rear cover 130 opposed to contact portion 74 of antenna 70A.

As the side of one end 70a of antenna 70A is pressed toward first housing portion 110 by projection portion 132, the side of one end 70a of antenna 70A pivots toward first housing portion 110 as a whole with fixed portion 76 being defined as the fulcrum. Contact portion 74 comes in contact with insert pin 60.

As set forth above, in the portable terminal device according to the second embodiment as well, as the side of one end 70a (free end) of antenna 70A is pushed toward rear cover 130, contact portion 74 can be in contact with insert pin 60 located in first housing portion 110. Therefore, an effect substantially the same as in the first embodiment is obtained.

Third Embodiment

Figure 7:
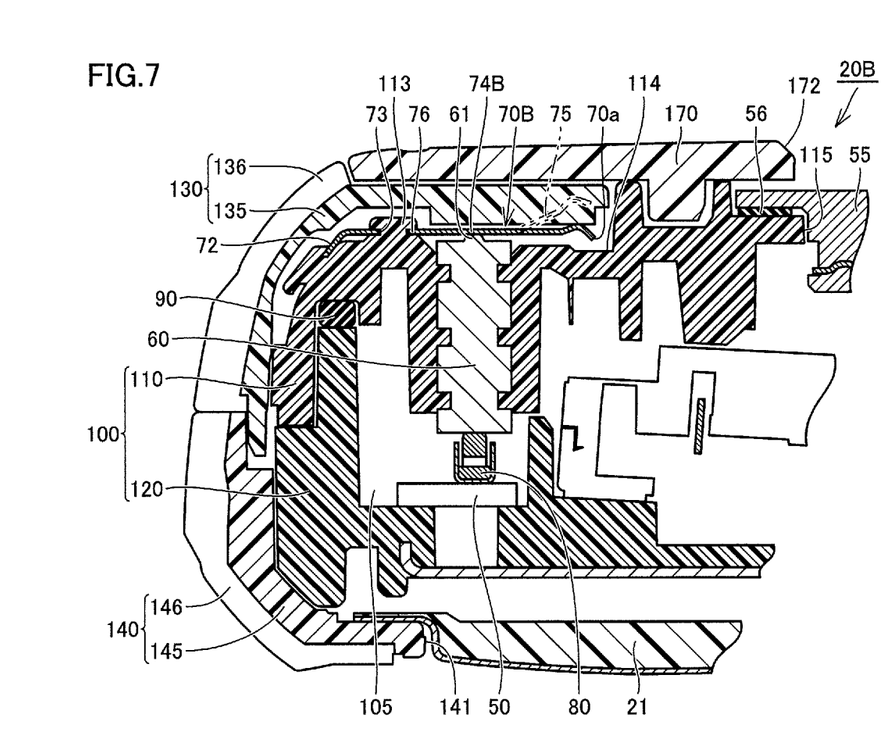
FIG. 7 is an enlarged cross-sectional view showing a structure around an antenna included in the portable terminal device according to a third embodiment.

FIG. 7 is an enlarged cross-sectional view showing a structure around an antenna included in the portable terminal device according to a third embodiment. The portable terminal device according to the third embodiment will be described with reference to FIG. 7.

As shown in FIG. 7, the portable terminal device according to the third embodiment is different from portable terminal device 1 according to the first embodiment in structure around an antenna 70B included in a second constituent portion 20B and otherwise substantially the same in construction.

In antenna 70B according to the third embodiment, a contact portion 74B is flat. Insert pin 60 includes a protrusion 61 protruding toward antenna 70B in a portion opposed to antenna 70B.

As a side of one end 70a of antenna 70B is pressed by rear cover 130, the side of one end 70a of antenna 70B pivots toward first housing portion 110 as a whole with fixed portion 76 being defined as the fulcrum. Contact portion 74B comes in contact with protrusion 61 of insert pin 60.

As set forth above, in the portable terminal device according to the third embodiment as well, as the side of one end 70a (free end) of antenna 70B is pushed toward rear cover 130, contact portion 74B can be in contact with insert pin 60 located in first housing portion 110. Therefore, an effect substantially the same as in the first embodiment is obtained.

Fourth Embodiment

Figure 8:
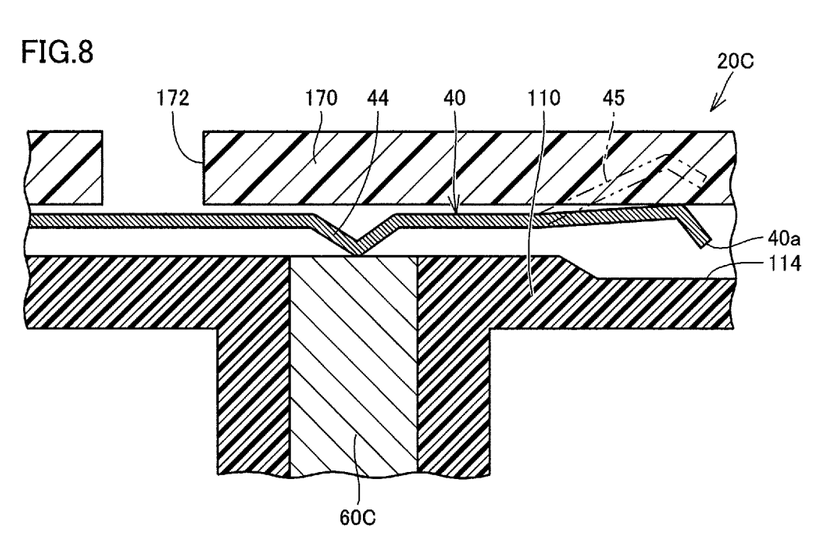
FIG. 8 is a schematic cross-sectional view showing a structure around a charge terminal included in the portable terminal device according to a fourth embodiment.

FIG. 8 is a schematic cross-sectional view showing a structure around a charge terminal included in the portable terminal device according to a fourth embodiment. The portable terminal device according to the fourth embodiment will be described with reference to FIG. 8. In the fourth embodiment, an example in which a construction equivalent to the construction of antenna 70 according to the first embodiment described above is employed as a charge terminal 40 as a connection member will be described.

As shown in FIG. 8, the portable terminal device according to the fourth embodiment is different from portable terminal device 1 according to the first embodiment in structure around charge terminal 40 in a second constituent portion 20C and otherwise substantially the same in construction.

An insert pin 60C as a conduction portion passes through first housing portion 110. Insert pin 60 is molded integrally with first housing portion 110 through insert molding.

Insert pin 60C includes a pair of first end portion and a second end portion in the longitudinal direction. A side of the first end portion of insert pin 60C is exposed to the outside of first housing portion 110 and a side of the second end portion of insert pin 60C is exposed to the inside of first housing portion 110. The side of the second end portion of insert pin 60C exposed to the inside of first housing portion 110 is electrically connected to a circuit substrate located inside first housing 110 by a spring terminal (not shown). The side of the first end portion of insert pin 60C can be in contact with charge terminal 40.

Charge terminal 40 is located between first housing portion 110 and lid member 170 as a cover member. Charge terminal 40 is covered with lid member 170 such that a part thereof is exposed. Charge terminal 40 includes a portion opposed to opening 172 in lid member 170.

Charge terminal 40 is made up of a metal piece in a form of a band. Charge terminal 40 includes a portion extending along the rear surface (outer surface) of first housing portion 110. A part of charge terminal 40 is fixed to first housing portion 110 with a fixing method the same as the fixing method according to the first embodiment described above. A fixed portion where the charge terminal is fixed to first housing portion 110 is thus formed also in charge terminal 40.

Charge terminal 40 is flexible. As charge terminal 40 is partially fixed, the side of one end 40a of charge terminal 40 is free and the side of one end 40a of charge terminal 40 can bend and deform.

Charge terminal 40 includes a contact portion 44 which is opposed to and in contact with insert pin 60C. Contact portion 44 is located between the fixed portion described above and one end 40a. Contact portion 44 is tapered.

As shown with a chain double dotted line in the figure, contact portion 44 includes an inclined portion 45 inclined away from first housing portion 110 between contact portion 44 and one end 40a (free end) before attachment of lid member 170 to first housing portion 110. Since charge terminal 40 includes inclined portion 45, the side of one end 40a of charge terminal 40 can reliably be pushed toward first housing portion 110 at the time of attachment of lid member 170.

As the side of one end 40a of charge terminal 40 is pressed toward first housing portion 110 by lid member 170, the side of one end 40a of charge terminal 40 pivots toward first housing portion 110 as a whole with the fixed portion described above being defined as the fulcrum. Contact portion 44 comes in contact with insert pin 60C.

As set forth above, in the portable terminal device according to the fourth embodiment, a part of charge terminal 40 in the form of the band is fixed to first housing portion 110 such that one end 40a is free. As lid member 170 covering first housing portion 110 presses the side of the free end toward first housing portion 110, contact portion 44 of charge terminal 40 can be in contact with insert pin 60C exposed to the outside and the inside of first housing portion 110.

Contact portion 44 and insert pin 60 can thus reliably be in contact with each other. Consequently, electrical connection between charge terminal 40 and insert pin 60C can be stabilized.

Even when a position of insert pin 60C is changed in terms of positional relation with an object to be accommodated in accommodation space 105, electrical connection between charge terminal 40 and insert pin 60C can be ensured by changing as appropriate a direction of extension and a length of charge terminal 40 in the form of the band. A degree of freedom in design is thus improved.

Though an example in which insert pin 60, 60C is molded integrally with first housing portion 110 through insert molding has been exemplified and described in the first to fourth embodiments above, limitation thereto is not intended and a conduction member may be inserted in a through hole located in first housing portion 110. In this case, the conduction member is liquid-tightly fixed to first housing portion 110 by a waterproof sealing member.

Without being limited to insert molding, a conduction member may be engaged with a housing by means of projections and recesses thereof, for example, as shown in FIGS. 5 to 7. The conduction member may include projections and recesses like threads and the housing may include projections and recesses which receive the projections and recesses like the threads. When the conduction member and the housing both include the projections and recesses, the conduction member and the housing are coupled as being in intimate contact with each other, capability of the housing to hold the conduction member is improved, and waterproofness is also enhanced.

When the conduction member and the housing both include the projections and recesses and one end of the connection member is pressed against the cover member, engagement between the projections and recesses of the conduction member and the projections and recesses of the housing can also be strengthened, and consequently a waterproof structure can also be improved.

Though an example in which the first end portion of insert pin 60, 60C protrudes outward relative to the outer surface of first housing portion 110 has been exemplified and described in the first to fourth embodiments above, limitation thereto is not intended. One end of insert pin 60, 60C may be located at a position recessed from the outer surface of first housing portion 110 (a position closer to the inner surface) so long as it is configured to be able to be in contact with an antenna or a charge terminal. Similarly, the second end portion of insert pin 60, 60C may also be located at a position recessed from the inner surface of first housing portion 110 (a position closer to the outer surface) so long as it is located to be able to connect to a circuit substrate with a spring terminal being interposed.

Though an example in which an antenna or a charge terminal is located in first housing portion 110 has been exemplified and described in the first to fourth embodiments above, limitation thereto is not intended, and it may be located in second housing portion 120. In this case, the antenna or the charge terminal is covered with the front cover.

Though description has been given in the first to fourth embodiments above by exemplifying a portable terminal device such as a portable telephone, a smartphone, a portable information terminal, or a tablet terminal as an electronic device, limitation thereto is not intended, and the electronic device may include a personal computer, a game console, a television receiver, a portable music player, a CD player, a DVD player, an electronic dictionary, an electronic book reader, a digital camera, a video camera, a radio receiver, and a navigation system.

Embodiments disclosed herein are illustrative and non-restrictive in every respect. The scope of the present disclosure is defined by the terms of the claims and is intended to include any modifications within the scope and meaning equivalent to the terms of the claims.

The invention claimed is:
1. An electronic device comprising:
a housing;

a conduction portion having one side exposed to outside of the housing and having the other side exposed to inside of the housing;

a cover member which covers the housing; and a flexible connection member which is located between the housing and the cover member, includes free one end, and has a part fixed to the housing, the connection member including a contact portion which is opposed to and in contact with the conduction portion, and the contact portion being in contact with the conduction portion as a side of the free end of the connection member is pressed toward the housing by the cover member.

2. The electronic device according to claim 1, wherein the contact portion is located between a fixed portion where the connection member is fixed to the housing and the free end.

3. The electronic device according to claim 1, wherein the contact portion protrudes toward the conduction portion.

4. The electronic device according to claim 1, wherein the connection member includes an inclined portion which is inclined away from the housing, between the contact portion and the free end before attachment of the cover member to the housing.

5. The electronic device according to claim 1, wherein a portion of the cover member which presses the connection member protrudes toward the housing relative to a portion of the cover member opposed to a fixed portion where the connection member is fixed to the housing.

6. The electronic device according to claim 1, wherein the housing includes a retracting portion where contact of the side of the free end of the connection member pressed by the cover member with the housing is avoided.

7. The electronic device according to claim 1, wherein the conduction portion includes a protrusion in a portion opposed to the connection member, which protrudes toward the connection member.

8. The electronic device according to claim 1, wherein the conduction portion is molded integrally with the housing.

9. The electronic device according to claim 1, wherein the connection member includes an antenna.

10. The electronic device according to claim 1, wherein the connection member includes a charge terminal.

* * * * *